(12) United States Patent
Lin et al.

(10) Patent No.: US 6,874,984 B2
(45) Date of Patent: Apr. 5, 2005

(54) EXPANSION BOLT HAVING INTERNAL SPHERICAL MEMBER AND REAR DRIVING BOLT

(76) Inventors: Yen-Tseng Lin, No. 36-4, Chu-Nan Town, Miao-Li Hsien (TW); Kun-Min Chiu, No. 36-4, Chu-Nan Town, Miao-Li Hsien (TW)

( * ) Notice: Subject to any disclaimer, the term of this patent is extended or adjusted under 35 U.S.C. 154(b) by 0 days.

(21) Appl. No.: 10/423,394

(22) Filed: Apr. 25, 2003

(65) Prior Publication Data

US 2004/0136802 A1 Jul. 15, 2004

(30) Foreign Application Priority Data

Jan. 9, 2003 (TW) ........................... 92200380 U

(51) Int. Cl.[7] .............................................. F16B 13/06
(52) U.S. Cl. ........................ 411/57.7; 411/44; 411/55
(58) Field of Search ............................ 411/60.1, 60.2, 411/57.1, 54, 54.1, 44, 71, 55

(56) References Cited

U.S. PATENT DOCUMENTS

| | | | | |
|---|---|---|---|---|
| 519,172 | A | * | 5/1894 | Calkins ................. 411/57.1 |
| 3,266,364 | A | * | 8/1966 | Becker .................... 411/44 |
| 3,479,072 | A | * | 11/1969 | Kosar ..................... 403/276 |
| 3,618,135 | A | * | 11/1971 | Weller .................... 333/232 |
| 4,607,992 | A | * | 8/1986 | Mauritz et al. ............ 411/45 |
| 5,017,067 | A | * | 5/1991 | Ohlin ..................... 411/45 |
| 5,527,023 | A | * | 6/1996 | Starr ...................... 269/43 |

FOREIGN PATENT DOCUMENTS

| | | | |
|---|---|---|---|
| TW | 345247 | 11/1998 | ........... F16B/13/06 |
| TW | 390394 | 5/2000 | ........... F16B/13/06 |

* cited by examiner

Primary Examiner—Flemming Saether

(57) ABSTRACT

An expansion bolt includes a sleeve in which a central bore is defined, comprising a rear inner-threaded section and a front tapering section. Radial slits are defined in a front end portion of the sleeve and partially in communication with the tapering bore to form a plurality of deformable pawls. At least one spherical member is received in the tapering bore and has a diameter greater than a smallest diameter of the tapering bore whereby the spherical member is effectively retained in the tapering bore. A driving member having external threading is threadingly received in the threaded bore for axially engaging the spherical member. By screwing the driving member, the spherical member is forced toward the front end of the sleeve and due to the tapering configuration of the tapering bore, the movement of the spherical member toward the front end of the sleeve forces the pawls to deform outward in a radial direction thereby securing the expansion bolt in a hole defined in for example a wall.

12 Claims, 10 Drawing Sheets

EXPANSION BOLT HAVING INTERNAL SPHERICAL MEMBER AND REAR DRIVING BOLT

BACKGROUND OF THE INVENTION

1. Field of the Invention

The present invention relates generally to an expansion bolt, and in particular to an internal driving expansion bolt comprising a spherical member for expanding a sleeve in a low-resistance and smoothly operating manner.

2. The Related Art

Expansion bolts are classified as external driving type and internal driving type. Both types of expansion bolts require "force impact" on an end of the bolt to expand a sleeve. The "force impact" that hits the bolt cannot be well controlled and may sometimes cause cracking of a wall in which the expansion bolt is fixed. In addition, since, after the impact, most of the bolt is completely received in the hole formed in the wall, there is no way for an observer to inspect if the bolt is properly mounted, which may lead to potential damage in applying a great load to the bolt. Further, an internal driving type expansion bolt requires a tool extending into the bolt for transmission of the "force impact" to the bolt. Threading formed inside the bolt is often damaged by the tool during the process of impacting.

In Taiwan Patent Publication No. 345247 that is issued to the present inventor, an expansion bolt is disclosed, comprising an inner-threaded sleeve defining a tapering hole in which a cone is movably received. A driving element is received in the sleeve for engaging the cone and threadingly engaging the inner threading of the sleeve. By screwing the driving element in the sleeve, the driving element axially drives the cone through the tapering bore in the sleeve thereby radially expanding the sleeve. A disadvantage of the conventional design is the great friction force induced when the cone is driven close to the smaller diameter end of the tapering bore. This is due to the great contact area between the cone and tapering bore.

Taiwan Patent Publication No. 390394, also issued to the present inventor, discloses an expansion bolt wherein the driving element is integrally formed with the cone so that a unitary driving and expanding member is movably received in the sleeve. Due to the same reasons, the unitary driving and expanding member is subject to a great friction force when it is moved close to the smaller diameter end of the tapering bore. In addition, since the sleeve of the expansion bolt is generally not made of high precision, the unitary driving and expanding member is subject to undesired eccentricity with respect to the sleeve to some extents. This makes it more difficult in driving the cone in a smoothly operating manner.

Thus, it is desired to have an expansion bolt that overcomes the above-discussed problems.

SUMMARY OF THE INVENTION

An object of the present invention is to provide an expansion bolt that can be operated in a smooth and effort-reduced manner for easy installation.

Another object of the present invention is to provide an expansion bolt that allows for precise control of expansion and thus the securing effect of the bolt.

A further object of the present invention is to provide an expansion bolt that does not damage threading thereof in installing the bolt.

Yet a further object of the present invention is to provide an expansion bolt having excellent securing effect.

To achieve the above objects, in accordance with the present invention, there is provided an expansion bolt comprising a sleeve in which a central bore is defined, comprising a rear inner-threaded section and a front tapering section. Radial slits are defined in a front end portion of the sleeve and partially in communication with the tapering bore to form a plurality of deformable pawls. At least one spherical member is received in the tapering bore and has a diameter greater than a smallest diameter of the tapering bore whereby the spherical member is effectively retained in the tapering bore. A driving member having external threading is threadingly received in the threaded bore for axially engaging the spherical member. By screwing the driving member, the spherical member is forced toward the front end of the sleeve and due to the tapering configuration of the tapering bore, the movement of the spherical member toward the front end of the sleeve forces the pawls to deform outward in a radial direction thereby securing the expansion bolt in a hole defined in for example a wall.

The expansion bolt of the present invention provides the following advantages:

(1) Since the contact area between the spherical member and the tapering bore of the expansion bolt is small, the driving force for overcoming the resistance in securing the expansion bolt is substantially reduced whereby the operation of the expansion bolt is smooth and easy.

(2) Since the spherical member automatically adjusts the relative position thereof with respect to the tapering bore, eccentricity between the spherical member and the tapering bore is automatically eliminated.

(3) Since the expansion or deformation of the pawls is in general proportion to the movement of the spherical member along the tapering bore and since the movement of the spherical member is dependent upon the axial displacement of the driving member that is controlled by the screwing operation, the amount of expansion or deformation of the pawls can be precisely controlled by well-controlled screwing operation.

(4) Since the movement of the spherical member is caused by screwing the driving member, no "force impact" is required to act upon the expansion bolt. Thus, damage to the inner threading of the expansion bolt is completely eliminated.

(5) The installation of the expansion bolt of the present invention can be easily done by first forming a hole in a fixture and inserting the expansion bolt into the hole and then screwing the driving member. No "force impact" or other operations that require great effort is needed.

(6) By positioning two or more spherical members in the tapering bore, after the pawls are deformed by the first one of the spherical members, the pawls can be maintained in the deformed condition by the second one of the spherical members.

(7) The driving member can be made with standard nut whereby costs of the expansion bolt can be reduced.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
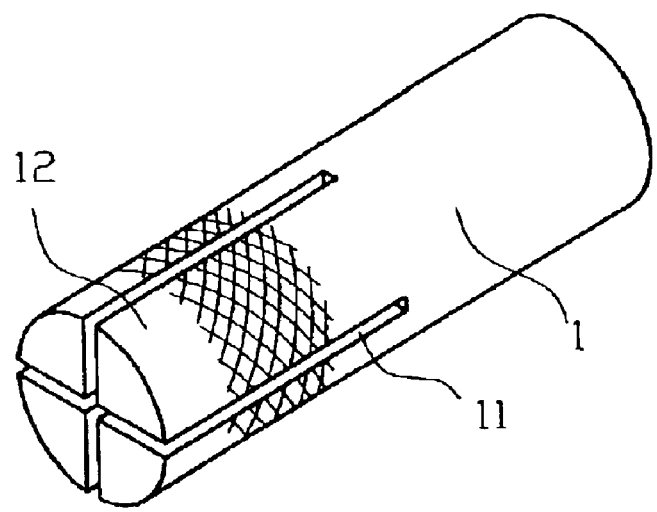
FIG. 1 is a perspective view of an expansion bolt constructed in accordance with a first embodiment of the present invention.
Figure 2:
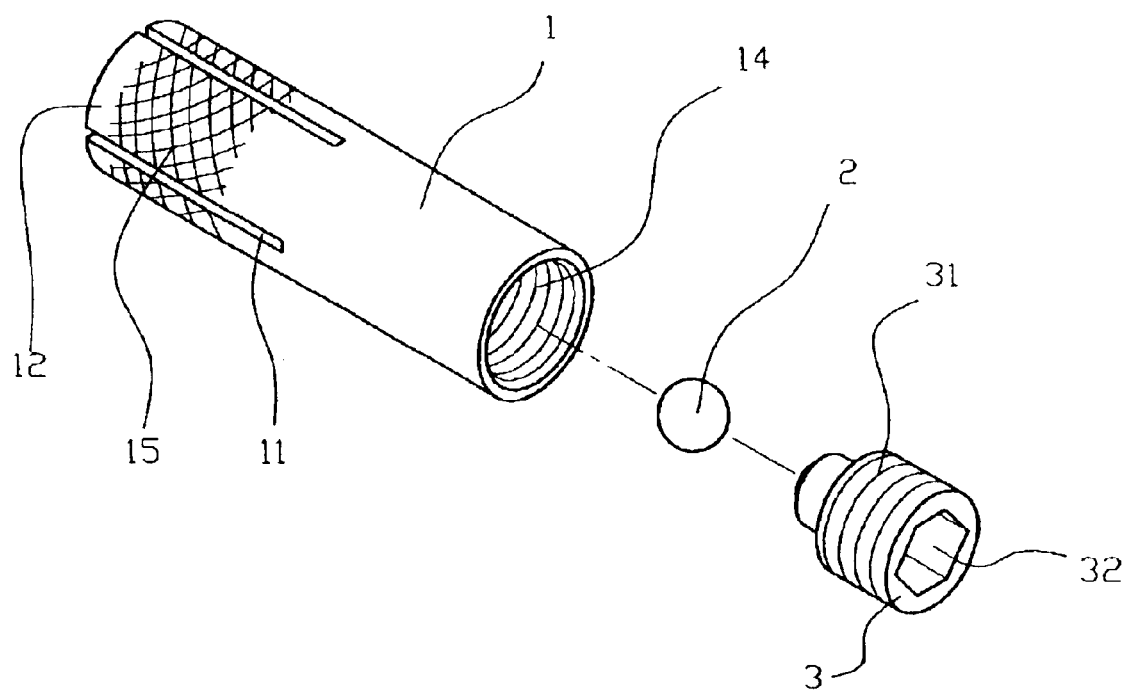
FIG. 2 is an exploded view of the expansion bolt of the present invention.
Figure 3:
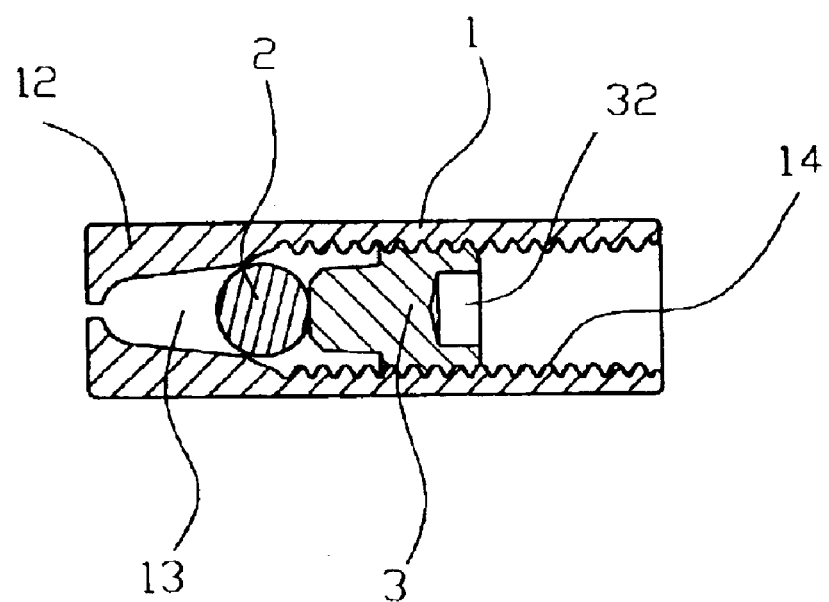
FIG. 3 is a cross-sectional view of the expansion bolt of the present invention.

With reference to the drawings and in particular to FIGS. 1–3, an expansion bolt constructed in accordance with the present invention comprises a sleeve 1 in which a central bore is defined. The central bore is comprised of a rear threaded section 14 and a front tapering section 13 having a smallest diameter adjacent a front end of the sleeve 1. A plurality of radial slits is defined in the front end of the sleeve 1 and in communication with the tapering section 13 to form a plurality of expandable or deformable pawls 12. In the embodiment illustrated, the tapering bore 13 has largest diameter corresponding to a nominal diameter of the threaded bore 14 whereby the tapering bore 13 is tapered from the threaded bore 14 toward the front end of the sleeve 1.

A spherical member 2 having a diameter greater than the smallest diameter of the tapering bore 13 is received and retained in the tapering bore 13. Preferably, the spherical member 2 has a diameter substantially corresponding to or greater than the inside diameter of the tapering bore 13 midway between the largest diameter end and the smallest diameter end thereof.

Figure 5:
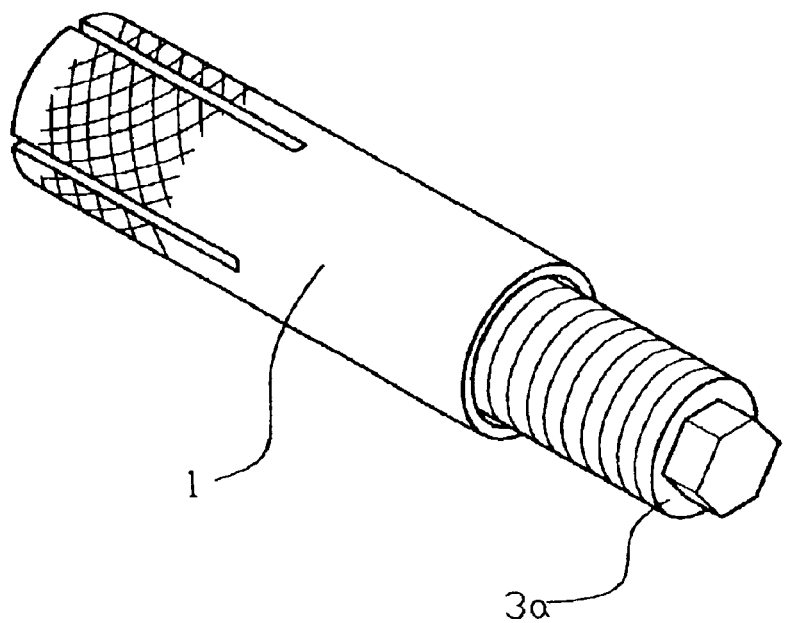
FIG. 5 is a perspective view of an expansion bolt constructed in accordance with a second embodiment of the present invention.

A driving member 3 having external threading 31 threadingly engaging the inner threading of the threaded bore 14 is received in the threaded bore 14 to axially engage the spherical member 2 and is axially movable with respect to the sleeve 1 by screwing operation. A hexagonal recess 32 is defined in a rear end of the driving member 3 for engaging a hexagon spanner (not shown) to screw the driving member 3 within the threaded bore 14. The hexagon recess 32 can be replaced by means of a flat slot for engaging a flat screwdriver or a polygonal projection as shown in FIG. 5 for engaging a wrench socket.

By screwing the driving member 14, the spherical member 2 is forced toward the front end of the sleeve 1. Due to the tapering configuration, the movement of the spherical member 2 toward the front end of the sleeve 1 causes the pawls 12 to deform outwardly and expanded radially. The expansion or deformation of the pawls 12 can be done in an easy and smooth manner for the contact area between the spherical member 2 and the tapering bore 13 is small and the movement of the spherical member 2 can be precisely controlled and done easily by screwing the driving member 3.

Figure 4:
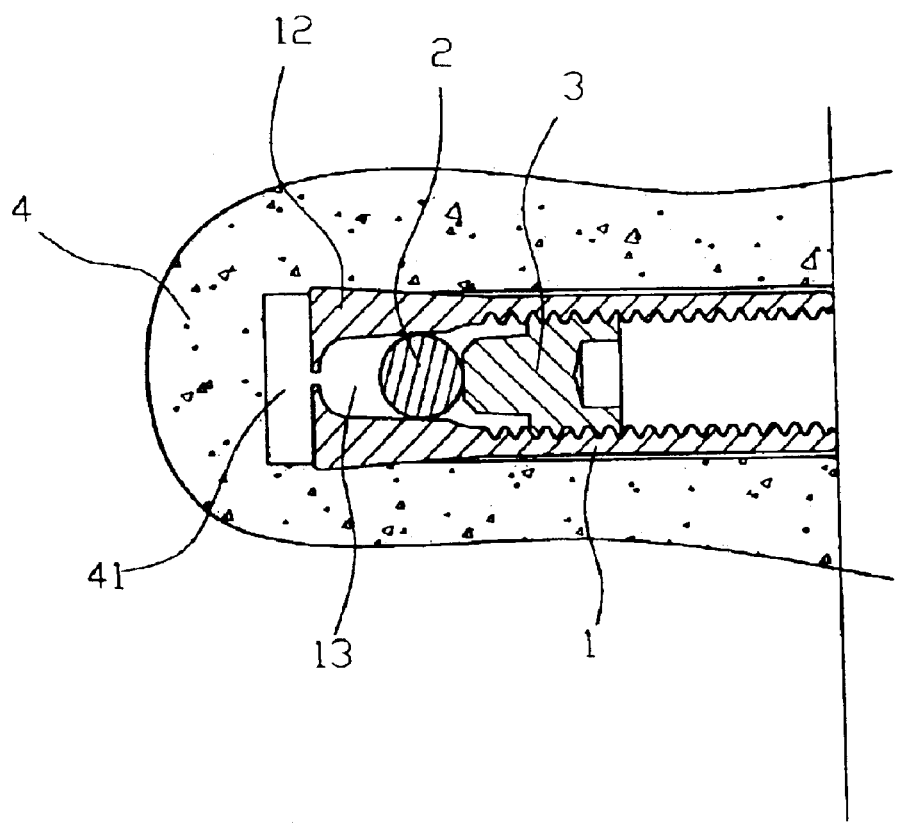
FIG. 4 is a cross-sectional view showing the expansion bolt installed in a hole defined in a fixture.

Also referring to FIG. 4, in installing the expansion bolt of the present invention, a hole 41 is first formed in a fixture 4, such as a wall for receiving the expansion bolt of the present invention therein. The driving member 3 is then screwed to axially move the spherical member 2 which in turn expands the pawls 12 outward to tightly engage an inside surface of the hole 41 thereby securing the expansion bolt in the hole 41.

Preferably, the pawls 12 are formed with rough outside surface, which can be formed by means of knurling, fluting, and forming barbs. In the embodiment illustrated, knurling 15 is formed on the outside surface of the pawls 12.

The tapering configuration of the tapering bore 13 can be linear or non-linear. In the embodiment illustrated, the tapering configuration comprises a non-linear section extending directly from the threaded bore 14 and a linear section extending from the non-linear section to the front end of the sleeve 1. A non-linear section is formed adjacent the front end of the sleeve 1 or the smallest diameter end of the tapering bore 13.

Also referring to FIG. 5, in which a second embodiment of the present invention is shown. The expansion bolt of the second embodiment comprises an elongated driving member 3a having a polygonal projection formed at a rear end thereof to engage a wrench socket (not shown) for screwing the driving member 3a. The elongated driving member 3a may partially extend beyond the rear end of the sleeve 1 whereby an external device, such as a machine, can be directly attached thereto by a nut (not shown) engaging the external threading of the driving member 3a.

Figure 6:
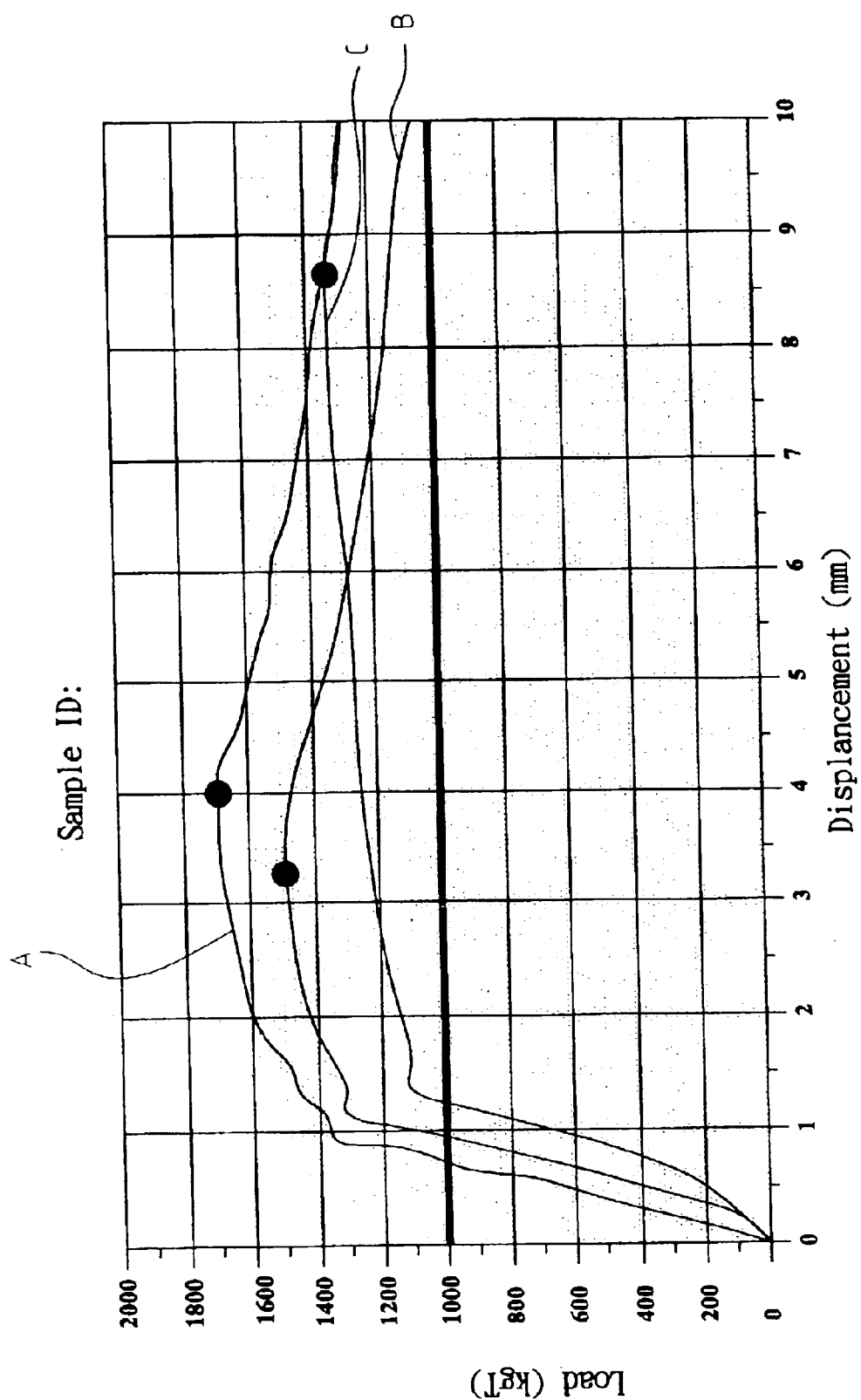
FIG. 6 is a plot of curves of load applied to the expansion bolt vs. displacement of the expansion bolt illustrating the superiority of the expansion bolt of the present invention.

FIG. 6 shows test result of the expansion bolts of the present invention. Three samples having an outside diameter of 12 mm are tested of which samples A and C are installed by hands, while sample B is tightened by a torque wrench. All the samples can take a load up to 1,000 Kg without substantial displacement and getting loose. This is much better than the conventional expansion bolts that can take only about 300–500 Kg. Apparently, the expansion bolt of the present invention can be easily and effortlessly installed.

Figure 7:
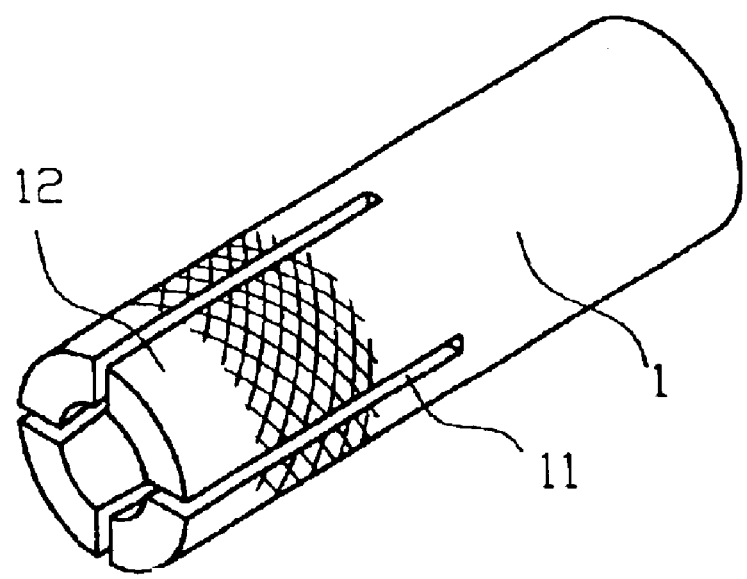
FIG. 7 is a perspective view of an expansion bolt constructed in accordance with a third embodiment of the present invention.

Also referring to FIG. 7 in which the linear section of the tapering bore 13 extending through the front end of the sleeve 1. This allows for the deformation of the pawls 12 to occur at a location more close to the front end of the sleeve. The manufacturing process of the expansion bolt can be simplified.

Figure 8:
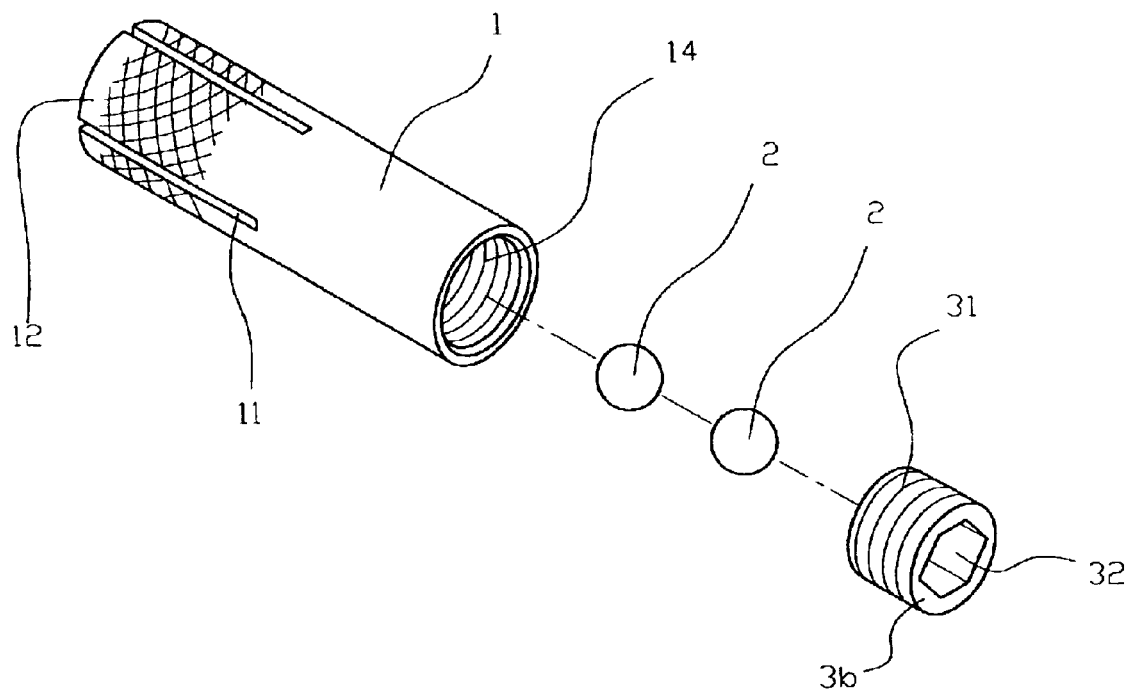
FIG. 8 is an exploded view of an expansion bolt constructed in accordance with a fourth embodiment of the present invention.
Figure 9:
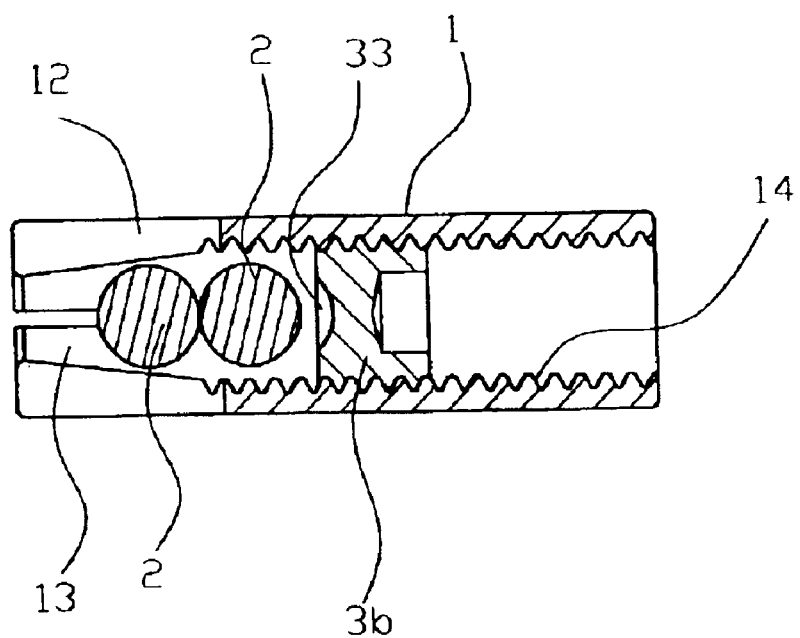
FIG. 9 is a cross-sectional view of the expansion bolt shown in FIG. 8.

FIGS. 8 and 9 show another embodiment of the expansion bolt of the present invention wherein two spherical members 2, a first one located close to the front end of the sleeve 1 and a second one engaging a driving member 3b, are received in the tapering bore 13. A concave surface 33 is defined in a front end of the driving member 3b for partially accommodating the second spherical member 3b. The advantages of two spherical members are: (1) that the second spherical member provides a second time deformation to the pawls 2 to maintain the pawls 2 in deformed condition and ensure the pawls positively engaging the inside surface of the hole 41 defined in the fixture 4, (2) that the driving member can be shortened and replaced by a standard nut for reducing costs of manufacturing; and (3) that the driving member is spaced from the pawls a longer distance, which ensures that the threading engagement between the driving member and the threaded bore of the sleeve is not adversely affected by the deformation of the pawls.

Figure 10:
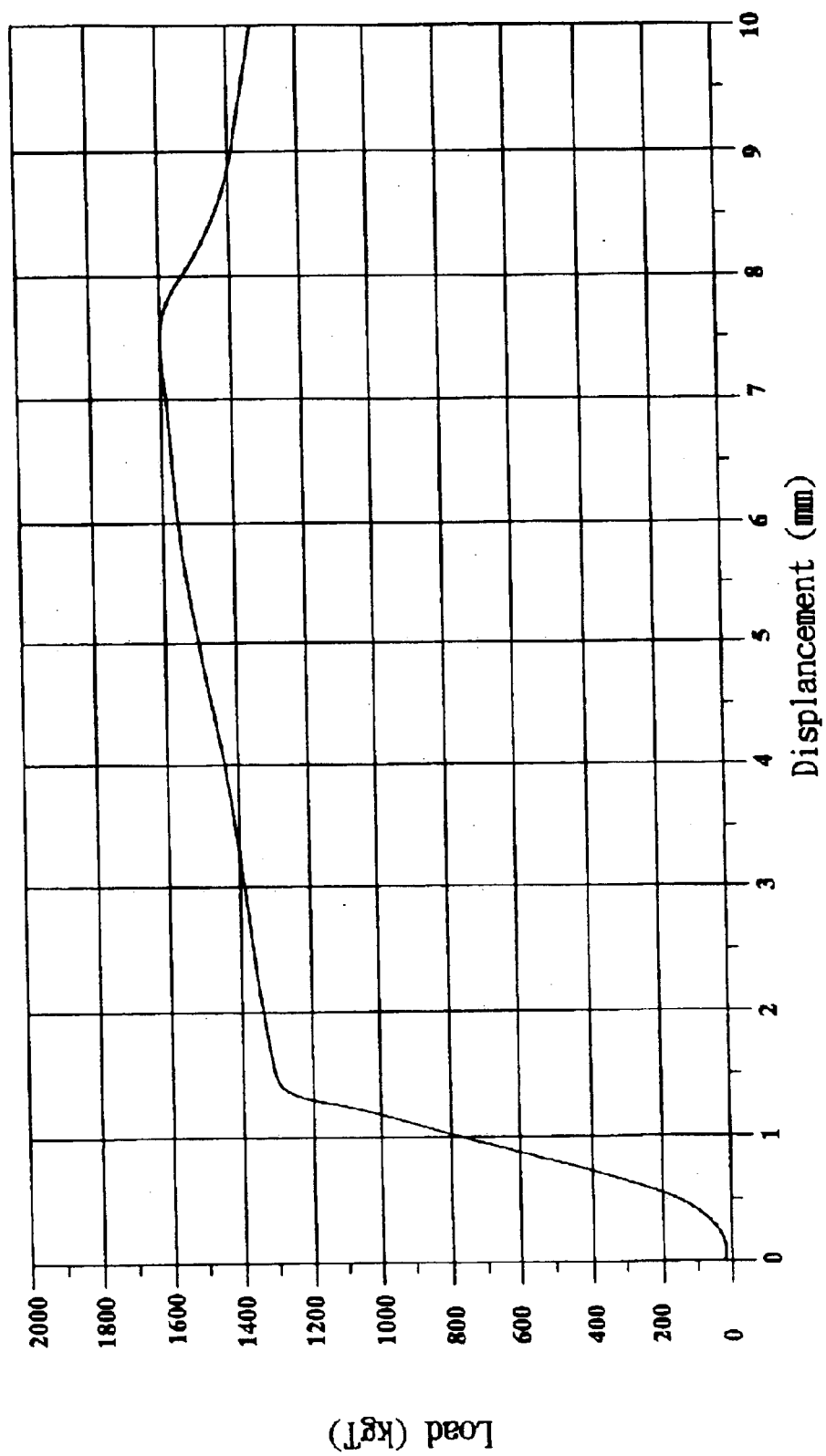
FIG. 10 is a plot of load that is applied to the expansion bolt of FIGS. 8 and 9 vs. displacement thereof.

A test result of the expansion bolt of FIGS. 8 and 9 is plotted in FIG. 10. Apparently, the securing effect of the expansion bolt of FIGS. 8 and 9 is further improved over that shown in FIGS. 1–3 in that it takes a load up to 1,300 Kg without displacement and fails after a load of 1,600 Kg is applied thereto. It is noted that the expansion bolt that is used in the test has an outside diameter of 12 mm.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An expansion bolt comprising:
   a sleeve defining a central bore comprised of a rear threaded bore and a front tapering bore having a diameter converging from a largest value adjacent the threaded bore toward a smallest value adjacent a front end of the sleeve, a plurality of radial slits being defined in the front end of the sleeve to form a plurality of deformable pawls;
   at least two spherical members received in the tapering bore, each spherical member having a diameter larger than the smallest diameter of the tapering bore; and
   a driving member received in the threaded bore and having external threading engaging the threaded bore, the driving member being axially movable in the threaded bore by being rotated to axially drive the spherical members toward the front end of the sleeve to deform the pawls outward.

2. The expansion bolt as claimed in claim 1, wherein at least one spherical member has a diameter greater than a diameter of the tapering bore at a location substantially midway between the largest and smallest diameters of the tapering bore.

3. The expansion bolt as claimed in claim 1, wherein the largest diameter of the tapering bore is substantially corresponding to a nominal diameter of the threaded bore.

4. The expansion bolt as claimed in claim 1, wherein the tapering bore has a linear convergence configuration.

5. The expansion bolt as claimed in claim 1, wherein the tapering bore has a non-linear convergence configuration.

6. The expansion bolt as claimed in claim 1, wherein the sleeve has a rough outside surface.

7. The expansion bolt as claimed in claim 1, wherein the sleeve has a knurled outside surface.

8. The expansion bolt as claimed in claim 1, wherein the driving member has a length extending beyond the sleeve.

9. The expansion bolt as claimed in claim 1, wherein the driving member has a rear end in which an engaging recess is formed for engaging with a tool.

10. The expansion bolt as claimed in claim 9, wherein the engaging recess is hexagonal.

11. The expansion bolt as claimed in claim 9, wherein the engaging recess is a flat slot for engaging a screwdriver.

12. The expansion bolt as claimed in claim 1, wherein the driving member has a rear end forming a polygonal projection for engaging a wrench socket.

* * * * *